United States Patent
Kunz et al.

(10) Patent No.: US 9,094,343 B1
(45) Date of Patent: Jul. 28, 2015

(54) METHOD AND SYSTEM FOR TAKING A NETWORK PORT OFFLINE

(75) Inventors: James A. Kunz, Plymouth, MN (US); Craig M. Verba, Maple Grove, MN (US); Thomas R. Prohofsky, Edina, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1493 days.

(21) Appl. No.: 12/412,050

(22) Filed: Mar. 26, 2009

Related U.S. Application Data

(60) Provisional application No. 61/114,406, filed on Nov. 13, 2008.

(51) Int. Cl.
| | | |
|---|---|---|
| H04L 12/863 | (2013.01) | |
| H04L 12/823 | (2013.01) | |
| H04L 12/865 | (2013.01) | |

(52) U.S. Cl.
CPC ............ *H04L 47/6215* (2013.01); *H04L 47/32* (2013.01); *H04L 47/6275* (2013.01)

(58) Field of Classification Search
CPC .................................................. H04L 47/6215
USPC ......... 370/252, 389, 392, 401, 412, 413, 414, 370/508
See application file for complete search history.

(56) References Cited

U.S. PATENT DOCUMENTS

| | | | | |
|---|---|---|---|---|
| 5,463,625 A * | 10/1995 | Yasrebi | ......................... | 370/401 |
| 5,546,543 A * | 8/1996 | Yang et al. | .................... | 709/235 |
| 6,115,356 A * | 9/2000 | Kalkunte et al. | ............... | 370/229 |
| 6,192,422 B1 * | 2/2001 | Daines et al. | .................... | 710/29 |
| 6,195,334 B1 * | 2/2001 | Kadambi et al. | ............... | 370/236 |
| 6,317,427 B1 * | 11/2001 | Augusta et al. | ................ | 370/357 |
| 6,487,208 B1 * | 11/2002 | Chirashnya et al. | .......... | 370/400 |
| 6,535,489 B1 * | 3/2003 | Merchant et al. | .............. | 370/244 |
| 6,732,186 B1 * | 5/2004 | Hebert | .......................... | 709/239 |
| 6,976,088 B1 * | 12/2005 | Gai et al. | ...................... | 709/238 |
| 6,981,174 B1 * | 12/2005 | Hanning | ........................... | 714/5 |
| 7,010,716 B2 * | 3/2006 | Yu et al. | ........................... | 714/4 |
| 7,035,255 B2 * | 4/2006 | Tzeng | ........................... | 370/389 |
| 7,085,966 B2 * | 8/2006 | Luick | .............................. | 714/43 |
| 7,237,016 B1 * | 6/2007 | Schober | ........................ | 709/223 |
| 7,260,066 B2 * | 8/2007 | Wang et al. | .................... | 370/248 |
| 7,340,325 B2 * | 3/2008 | Sousa et al. | ................... | 700/295 |
| 7,460,527 B2 * | 12/2008 | Ghosh et al. | .................. | 370/360 |
| 7,483,394 B2 * | 1/2009 | Chang et al. | .................. | 370/254 |
| 2002/0012341 A1 * | 1/2002 | Battle et al. | .................... | 370/378 |
| 2004/0008722 A1 * | 1/2004 | G. Ellis et al. | ............... | 370/461 |
| 2004/0085894 A1 * | 5/2004 | Wang et al. | .................... | 370/216 |
| 2005/0108444 A1 * | 5/2005 | Flauaus et al. | .................. | 710/15 |
| 2005/0249123 A1 * | 11/2005 | Finn | ............................... | 370/242 |
| 2005/0271073 A1 * | 12/2005 | Johnsen et al. | ............... | 370/428 |

(Continued)

*Primary Examiner* — Andrew Lai
*Assistant Examiner* — Andrew C Lee
(74) *Attorney, Agent, or Firm* — Klein, O'Neill & Singh, LLP

(57) ABSTRACT

Method and system for network communication including identifying a first network port to be taken offline. Before taking the first network port offline, processing any pending packet tag for the first network port. The method further includes taking the first network port offline; storing a packet tag destined for the first network port at the second network port, while the first network port is offline; bringing the first network port online; and routing the packet tag stored at the second network port, while the first network port was offline; wherein the packet tag is routed from the second network port to the first network port.

15 Claims, 7 Drawing Sheets

(56) References Cited

U.S. PATENT DOCUMENTS

| | | |
|---|---|---|
| 2007/0076701 A1* | 4/2007 | Yamada .................. 370/386 |
| 2007/0274204 A1* | 11/2007 | Varada et al. ............. 370/218 |
| 2008/0273456 A1* | 11/2008 | Messing et al. ............. 370/219 |
| 2009/0201909 A1* | 8/2009 | Bou-Diab et al. .......... 370/351 |
| 2010/0014525 A1* | 1/2010 | Rehman et al. .......... 370/395.7 |

* cited by examiner

METHOD AND SYSTEM FOR TAKING A NETWORK PORT OFFLINE

CROSS REFERENCE TO RELATED APPLICATION

This application claims the benefit and priority of U.S. Provisional Application Ser. No. 61/114,406, entitled Method and System for Taking A Network Port Offline, filed Nov. 13, 2008, which is incorporated herein by reference in its entirety for all purposes.

BACKGROUND

1. Technical Field

The present invention relates to networks.

2. Related Art

Network systems are commonly used to move network information (may also be referred to interchangeably, as frames, packets or commands) between computing systems (for example, servers) or between computing systems and network devices (for example, storage systems). Various hardware and software components are used to implement network communication, including network switches.

A network switch is typically a multi-port device where each port manages a point-to-point connection between itself and an attached system. Each port can be attached to a server, peripheral, input/output subsystem, bridge, hub, router, or another switch. The term network switch as used herein includes a Multi-Level switch that uses plural switching elements within a single switch chassis to route data packets.

A network switch port may be routinely taken offline for maintenance, credit loss, and reconfiguration of virtual lanes, for collecting statistics or any other reason. It is desirable to reduce packet loss when a port is taken offline and then brought online.

SUMMARY

The present disclosure provides a system and associated method for delaying packet delivery to a port to be taken offline while maintaining in order packet delivery.

In one embodiment, a method for network communication is provided. The method includes identifying a first network port to be taken offline. Before taking the first network port offline, processing any pending packet tag for the first network port. The method further includes taking the first network port offline; storing a packet tag destined for the first network port at the second network port, while the first network port is offline. Thereafter, bringing the first network port online and routing the packet tag stored at the second network port, while the first network port was offline; wherein the packet tag is routed from the second network port to the first network port.

In another embodiment, a system for network communication is provided. The system includes a first network port configured to receive and transmit a network packet; and a second network port configured to communicate with the first network port. The first network port is identified to be taken offline and before taking the first network port offline, any pending packet tag at the first network port is processed. While the first network port is offline, the second network port is configured to stop a packet tag that is destined for the first network port and store the packet tag at the second network port. When the first network port is brought online, the second network port routes the packet tag stored at the second network port to the first network port.

In another embodiment, a method for network communication is provided. The method includes identifying a first network port to be taken offline; and before taking the first network port offline, processing all pending tags for the first network port. Thereafter, stopping all packet flow to the first network port from other network ports that communicate with the first network port; and storing all tags received at the other network ports while the first network port is offline.

The method further includes bringing the first network port online and releasing all stored tags to the first network port from the other network ports after the first network port is back online.

This brief summary has been provided so that the nature of the disclosure may be understood quickly. A more complete understanding of the disclosure can be obtained by reference to the following detailed description concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Figure 1A:
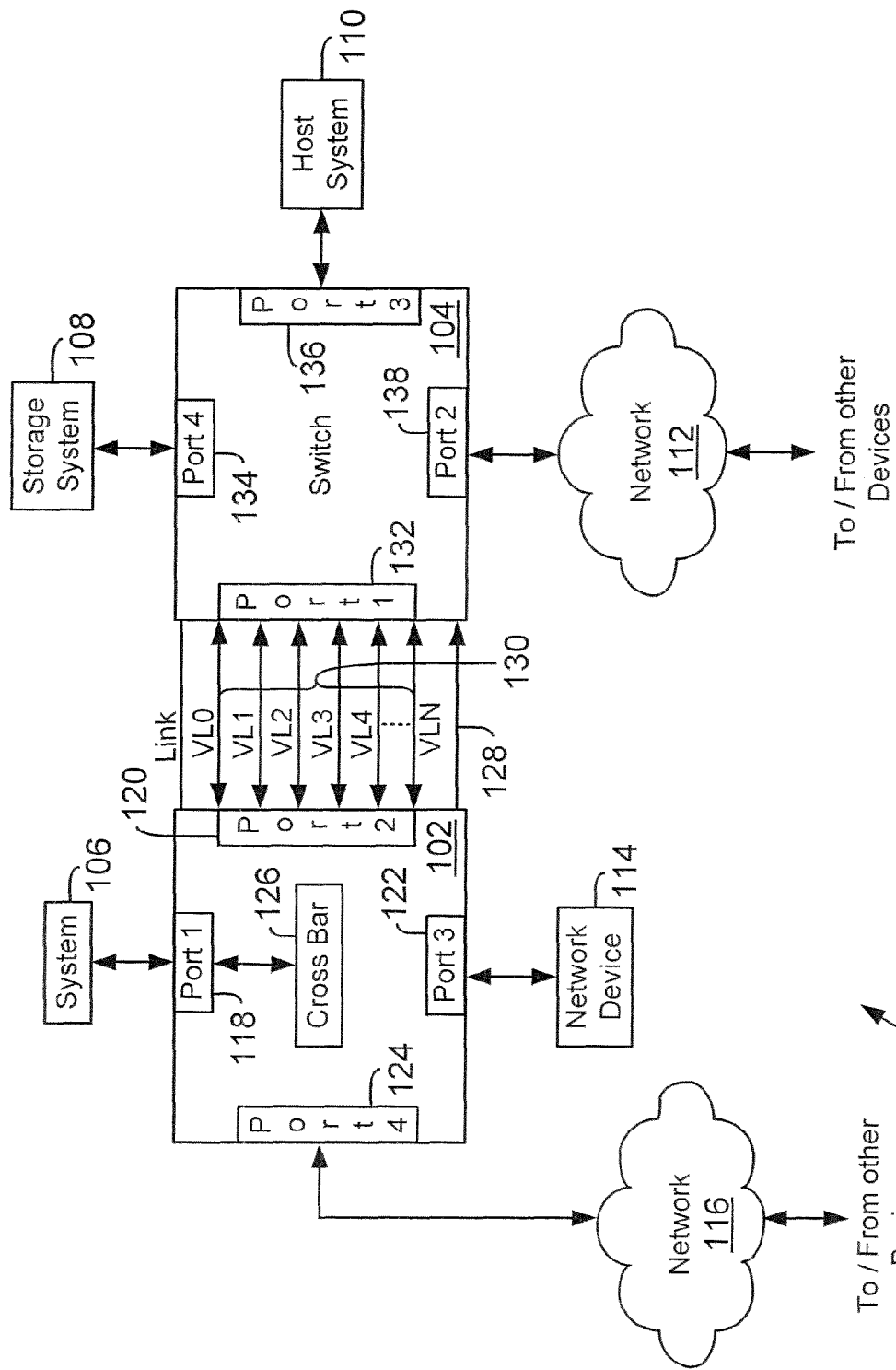
FIG. 1A shows a block diagram of a network system, according to one embodiment.

Definitions:

The following definitions are provided for convenience as they are typically (but not exclusively) used in Infiniband and general networking environment, implementing the various adaptive aspects described herein.

Infiniband ("IB") is a switched fabric interconnect standard for servers, incorporated herein by reference in its entirety. IB technology is deployed for server clusters/enterprise data centers ranging from two to thousands of nodes. The IB standard is published by the InfiniBand Trade Association, and is incorporated herein by reference in its entirety.

"Inter switch link" or "ISL": A physical link that is used for connecting two or more switches.

"Offline": Status of a network port, which is not receiving and transmitting network packets at any given time. A network port may be taken offline for maintenance.

"Online": Status of a network port when it is operating to send and receive network packets.

"Packet": A group of one or more network data word(s) used for network communication.

"Switch": A device that facilities network communication.

"Virtual Lane" (VL): The term VL as defined by Section 3.5.7 of the IB Specification provides a mechanism for creating virtual links within a single physical link. A virtual lane represents a set of transmit and receive buffers in a port. A data VL is used to send IB packets and according to the IB Specification, configured by a subnet manager based on a Service Level field in a packet.

Any of the embodiments described with reference to the figures may be implemented using software, firmware, hardware (e.g., fixed logic circuitry), manual processing, or a combination of these implementations. The term "logic" "module," "component," "system" or "functionality" as may be used herein generally represents software, firmware, hardware, or a combination of these elements. For instance, in the case of a software implementation, the term "logic," "module," "component," "system," or "functionality" represents program code that performs specified tasks when executed on a processing device or devices (e.g., processors). The program code can be stored in one or more computer readable memory devices.

Generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over plural locations.

The terms "machine-readable media" or the like when used, refer to any kind of medium for retaining information in any form, including various kinds of storage devices (magnetic, optical, static, and the like). The term machine-readable media also encompasses transitory forms for representing information, including various hardwired and wireless links for transmitting the information from one point to another.

The embodiments disclosed herein, may be implemented as a computer process (a method), a computing system, or as an article of manufacture, such as a computer program product or computer readable media. The computer program product may be a computer storage media readable by a computer device and encoding a computer program of instructions for executing a computer process. The computer program product may also be a propagated signal on a carrier readable by a computing system and encoding a computer program of instructions for executing a computer process.

Various industry standards, hardware and software components are typically used to implement network communication. The IB is one such industry standard used with computing systems and input/output (I/O) devices. The IB is used to create fabrics that are complex networks, which may encompass hundreds and even thousands of interconnected hosts/switches/servers, all working in parallel to solve complex problems.

It is noteworthy that the disclosed embodiments are not limited to the IB environment. The capabilities disclosed herein are applicable to other network protocols and standards, for example, the Fibre Channel (FC), the Fibre Channel over Ethernet (FCOE) standard and others.

To facilitate an understanding of the various embodiments, the general architecture and operation of a network system with respect to the IB standard will be described. The specific architecture and operation of the various embodiments will then be described with reference to the general architecture of the network system.

An IB switch is typically a multi-port device. Physical links (optical or copper) connect each port in a switch to another IB switch or an end device (for example, Target Channel Adapter (TCA) or a Host Channel Adapter (HCA)).

FIG. 1A shows a block diagram of a network system 100 for moving network information between various ports, according to one embodiment. System 100 includes one or more switches, for example, switches 102 and 104, operationally coupled to various other elements using various ports, for example, ports 118, 120, 122 and 124 on switch 102 and ports 132, 134, 136 and 138 on switch 104.

In one embodiment, switch 102 may be coupled to system 106, network device 114 and network 116, via ports 113, 122 and 124, respectively. Switch 104 may be operationally coupled to storage system 108, network 112 and host system 110 via ports 134, 138, and 136, respectively. In one embodiment, port 120 of switch 102 may be coupled to port 132 via a network link 128. A plurality of virtual lanes 130 (shown as VL0 to VLn) may be used between ports 120 and port 132.

Systems 106, 108 and 110 typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Figure 1B:
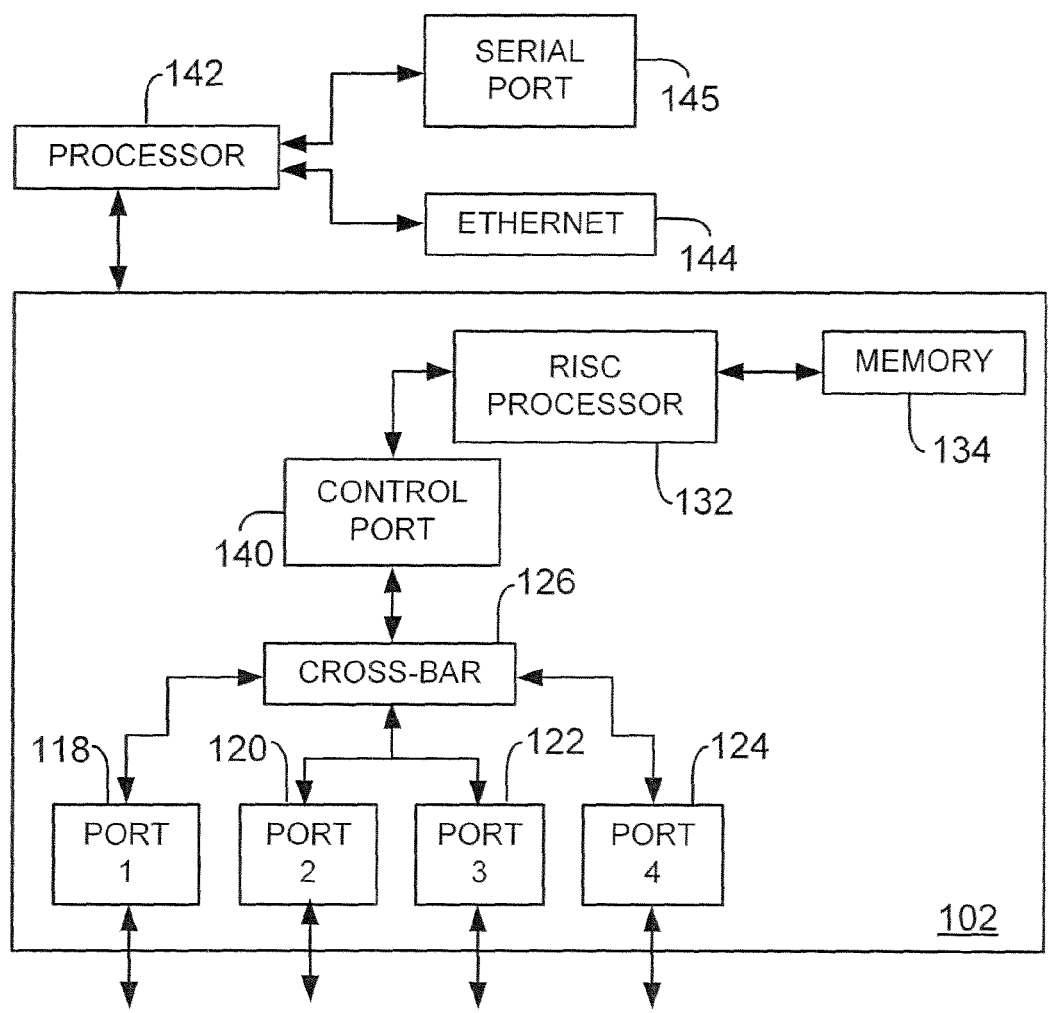
FIG. 1B shows a block diagram of a switch using the system, according to one embodiment.

FIG. 1B shows a block diagram of switch 102 that includes a processor 142, which is operationally coupled to plural ports 118, 120, 122 and 124 via a control port 140 and crossbar 126. In one embodiment, processor 142 may be a reduced instruction set computer (RISC) type microprocessor. Processor 142 executes firmware instructions out of memory 134 to control the overall operations of switch 102. Crossbar 126 is used to move information among ports 118-124. Control port 140 is used to send control information to each port.

Switch 102 may be coupled to an external processor 142 that is coupled to an Ethernet port 144 and serial port 145. In one embodiment, processor 142 may be a part of computing system 106. A network administrator may use processor 142 to configure switch 102.

Figure 1C:
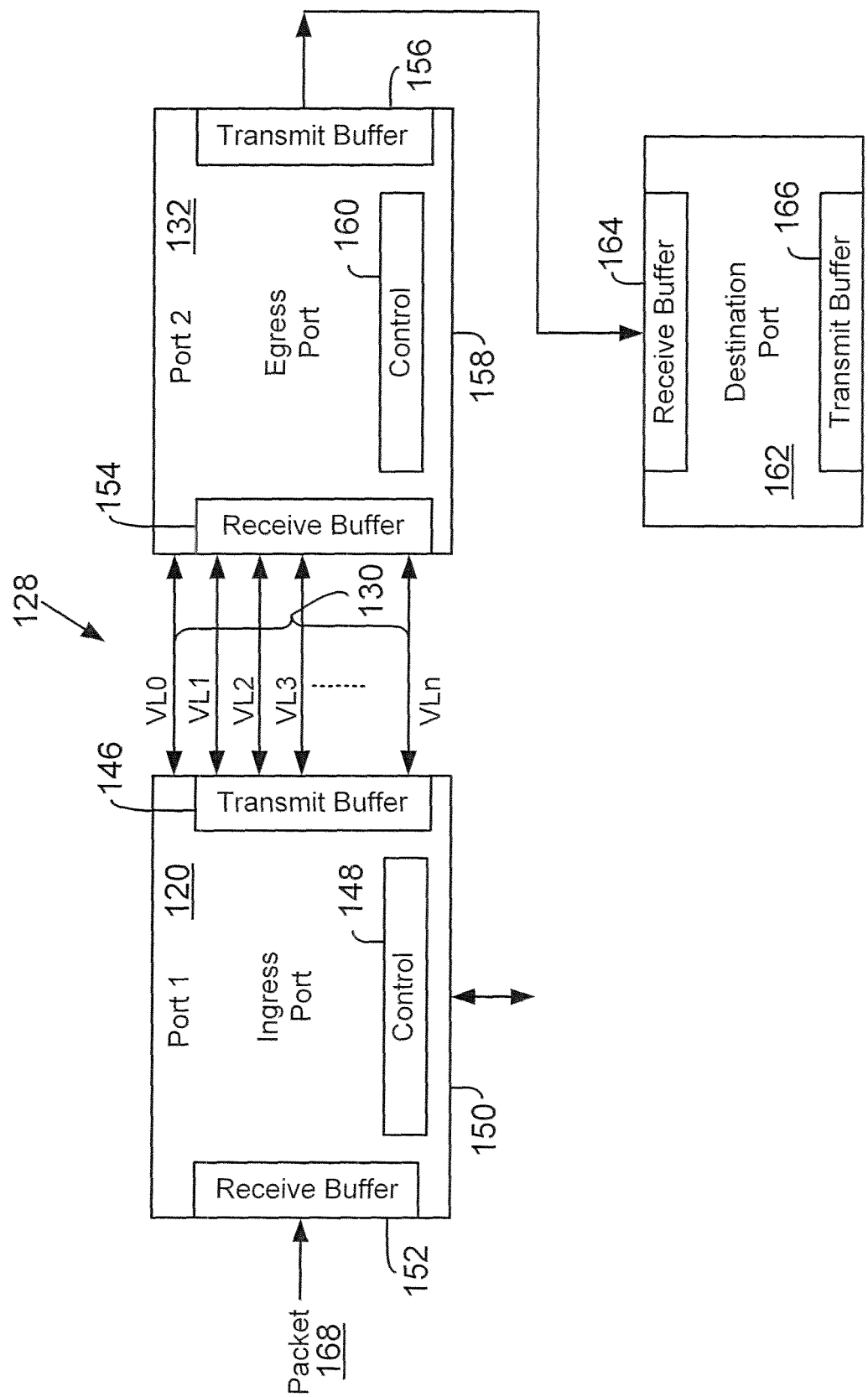
FIG. 1C shows a plurality of ports communicating with each other, according to one embodiment.

FIG. 1C shows an example of packet flow among a plurality of ports. In this example, port 120 (ingress) receives a network packet 168 and sends the network packet 168 to port 132 (egress), which sends the packet to a destination port, port 162.

Each port 120, 132 and 162 may include a receive buffer 152, 154 and 164, respectively, to receive and temporarily store a network packet, such as packet 168. Each port 120, 132 and 162 may also include a transmit buffer 146, 156 and 166, respectively, to temporarily store a packet before the packet is sent to its destination.

Generally, to ensure proper flow control, credit (i.e. available space) should be available at a receive buffer before a packet is transmitted by a port. For example, before ingress port 120 sends packet 168 to egress port 132, space should be available at receive buffer 154 of egress port 132. Egress port 132 sends a flow control packet to ingress port 120 to synchronize available credit information between egress port 132 and ingress port 120.

Figure 2A:
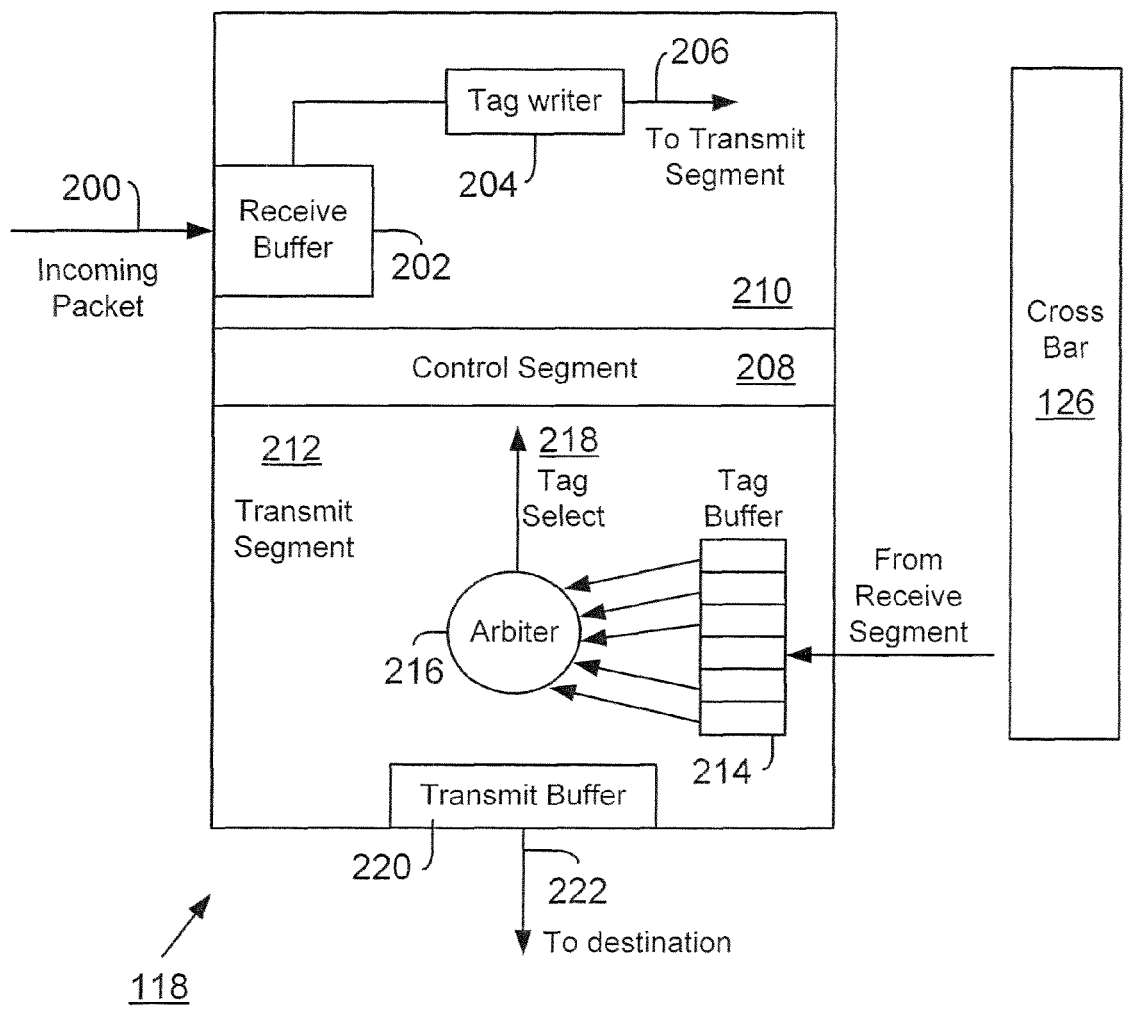
FIG. 2A shows an example a port structure, used according to one embodiment.

FIG. 2A shows an example of a port 118, according to one embodiment. Port 118 includes a receive segment 210 for receiving and processing received packets; a control segment 208 for storing port level control information and a transmit segment 212 that transmits packets to their destinations.

An incoming packet is received and stored at receive buffer 202 in receive segment 210. A tag writer module 204 in receive segment 210 generates a tag 218 (FIG. 2B) for the packet.

Figure 2B:
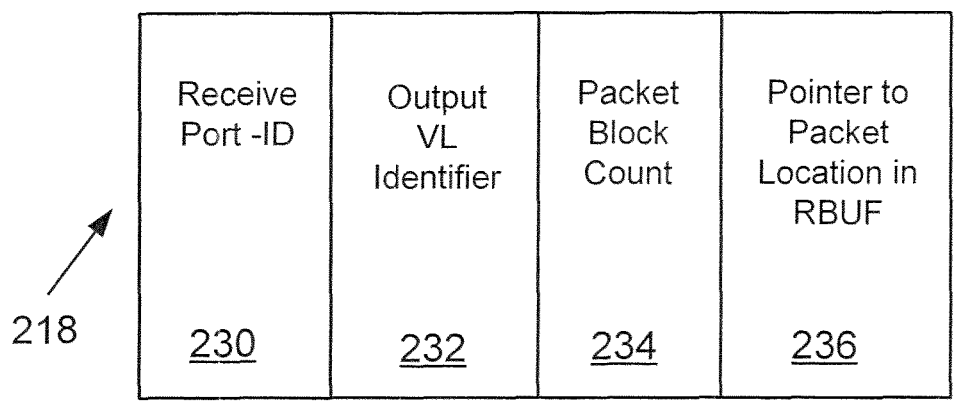
FIG. 2B shows an example of a tag, used according to one embodiment.

As shown in FIG. 2B, tag 218 includes a plurality of fields, for example, (a) a receive port identifier 230 that uniquely identifies a port that receives a packet; (b) a virtual lane identifier 232 that identifies a virtual lane that is used for transmitting a received packet; (c) a packet block count 234 that provides a estimate of packet size; and (d) a pointer 236 that indicates where in a receive buffer a packet is being stored before the packet is transmitted by a transmit segment.

Tag writer 204 forwards tag 218 at 206 to the transmit segment 212. The transmit segment 212 includes a tag buffer 214 used to store a plurality of tags and an arbiter 216, which receives requests for processing tags 218. Arbiter 216 selects one of the plurality of tags 218. A packet 200 associated with tag 218 is then fetched from a receive buffer location and transmitted to its destination 222 by the transmit segment 212, via transmit buffer 220.

Figure 2C:
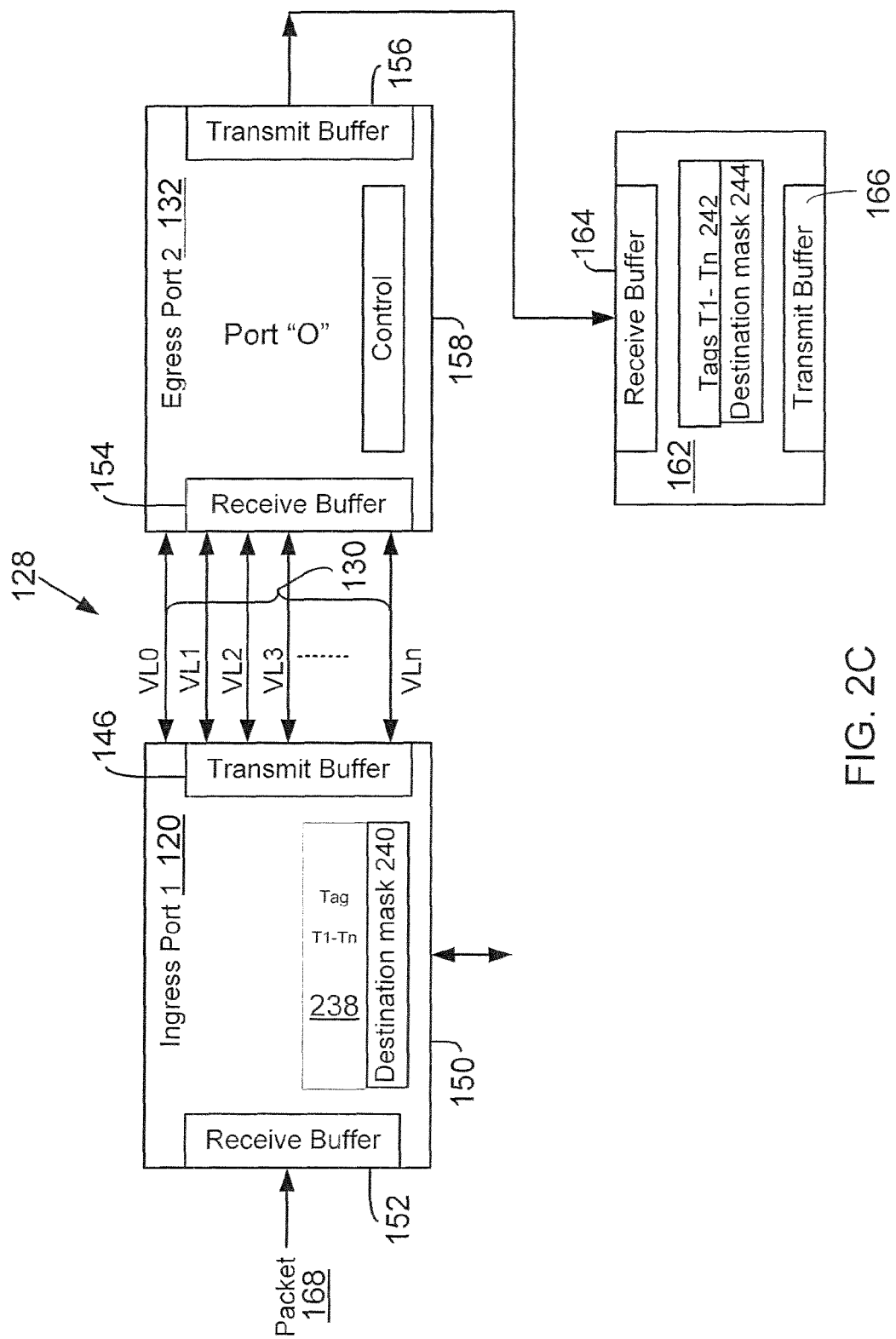
FIG. 2C shows an example of using a destination mask, according to one embodiment.

FIG. 2C shows an example of taking a port offline and then bringing it online, according to one embodiment. The Ports in FIG. 2C are the same ports shown in FIG. 1C and described above.

At any given time, as an example, egress port 132 is to be taken offline (shown as "Port O"). Firmware for Ports 120 and 162 program a "Destination Port Reject Mask" 240 and 244. When port 132 is taken offline, the destination port reject mask stops all tag/packet flow to port 132. Tags 238 and 242 destined for egress port 132 are stored at ports 120 and 162. When port 132 is brought online, tags 238 and 242 are released and sent to port 132.

Figure 3:
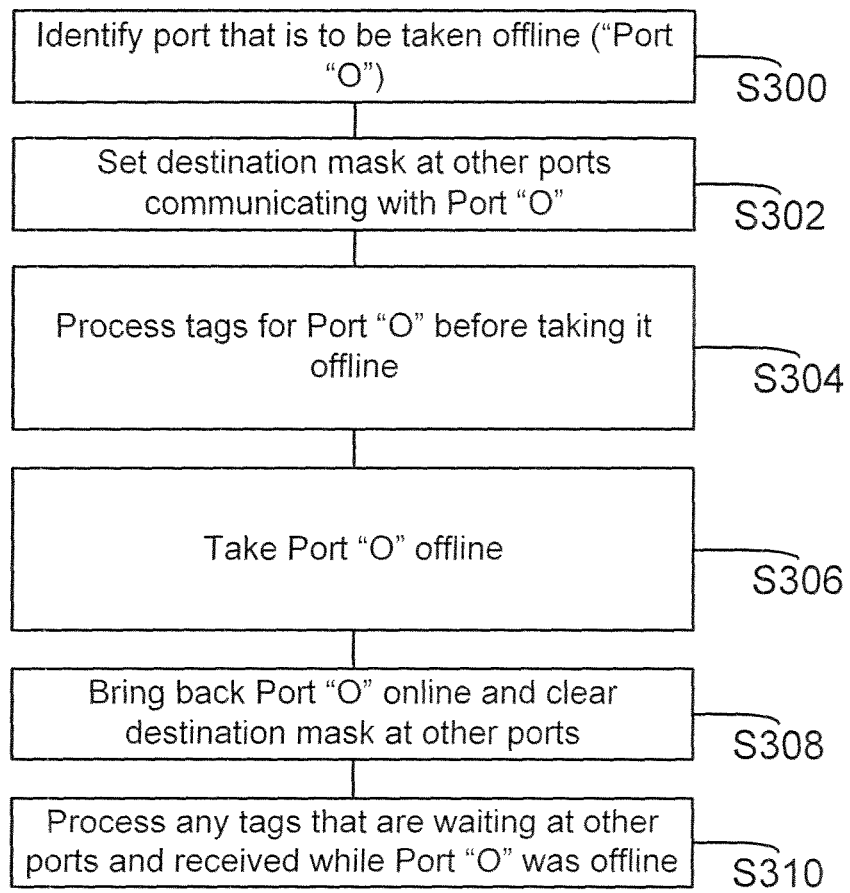
FIG. 3 shows a process flow diagram according to one embodiment.

FIG. 3 shows a process flow diagram for taking a port offline, according to one embodiment.

The process begins in block S300, when at any given time; a port that is to be taken offline is identified (for example, port 132) ("Port O"). In one embodiment, a network administrator (not shown) identifies the port that is to be taken offline.

In block, S302, a destination port mask is set in ports (for example, 120 and 162, FIG. 2C) that communicate with the port identified in block S300.

In block S304, all the pending tags for Port "O" are processed.

In block S306, Port "O" is taken offline.

In block S308, Port "O" is brought back online. The destination mask is then cleared. In block S310, tags stored at the masked ports (238 and 242) are received by Port "O" and processed.

In one embodiment, fewer packets are lost when a port is taken offline.

Although the present disclosure has been described with reference to specific embodiments, these embodiments are illustrative only and not limiting. Many other applications and embodiments of the present disclosure will be apparent in light of this disclosure and the following claims.

What is claimed is:

1. A method for network communication, comprising:
identifying a first network port to be taken offline;
before taking the first network port offline, processing any pending packet tag for the first network port; wherein the packet tag includes information regarding a network packet;
taking the first network port offline;
storing the packet tag destined for the first network port at a second network port, while the first network port is offline;
bringing the first network port online; and
routing the packet tag stored at the second network port, while the first network port was offline; wherein the packet tag is routed from the second network port to the first network port.

2. The method of claim 1, wherein the first network port and the second network port each comprise a receive buffer to receive and temporarily store packets; and a transmit buffer to temporarily store packets before the packets are sent to destination ports.

3. The method of claim 1, wherein a network administrator using a computing system identifies the first network port that is to be taken offline.

4. The method of claim 1, wherein the first network port and the second network port are included on a network device.

5. The method of claim 1, wherein the first network port and the second network port are included on different network devices.

6. A system for network communication, comprising:
a first network port configured to receive and transmit a network packet; and
a second network port configured to communicate with the first network port;
wherein the first network port is identified to be taken offline; and before taking the first network port offline, any pending packet tag at the first network port is processed; wherein the packet tag includes information regarding the network packet;
wherein when the first network port is offline, the second network port is configured to stop a packet tag that is destined for the first network port and store the packet tag at the second network port; and
wherein when the first network port is brought online, the second network port routes the packet tag stored at the second network port to the first network port.

7. The system of claim 6, wherein the first network port and the second network port each comprise a receive buffer to receive and temporarily store packets; and a transmit buffer to temporarily store packets before the packets are sent to destination network ports.

8. The system of claim 6, wherein a network administrator using a computing system identifies the first network port that is to be taken offline.

9. The system of claim 6, wherein the first network port and the second network port are included on a network device.

10. The system of claim 6, wherein the first network port and the second network port are included on different network devices.

11. A method for network communication, comprising:
identifying a first network port to be taken offline;
before taking the first network port offline, processing all pending tags for the first network port;
stopping all packet flow to the first network port from other network ports that communicate with the first network port;
storing all tags received at the other network ports, while the first network port is offline;
bringing the first network port online; and
releasing all stored tags to the first network port from the other network ports after the first network port is back online.

12. The method of claim 11, wherein the first network port and the other network ports each comprise a receive buffer to receive and temporarily store packets; and a transmit buffer to temporarily store packets before the packets are sent to destination ports.

13. The method of claim 11, wherein a network administrator using a computing system identifies the first network port that is to be taken offline.

14. The method of claim 11, wherein the first network port and the other network ports are included on a network device.

15. The method of claim 11, wherein the first network port and the other network ports are included on different network devices.

\* \* \* \* \*

UNITED STATES PATENT AND TRADEMARK OFFICE
CERTIFICATE OF CORRECTION

PATENT NO. : 9,094,343 B1  
APPLICATION NO. : 12/412050  
DATED : July 28, 2015  
INVENTOR(S) : Kunz et al.

Page 1 of 1

It is certified that error appears in the above-identified patent and that said Letters Patent is hereby corrected as shown below:

IN THE SPECIFICATION

In column 4, line 9, delete "113," and insert -- 118, --, therefor.

Signed and Sealed this
Fifteenth Day of March, 2016

Michelle K. Lee
*Director of the United States Patent and Trademark Office*